(12) United States Patent
Bauer et al.

(10) Patent No.: US 9,096,702 B2
(45) Date of Patent: Aug. 4, 2015

(54) ACRYLONITRILE-SILAZANE COPOLYMERS, ESPECIALLY IN FIBER FORM, PROCESS FOR PREPARATION THEREOF AND USE THEREOF

(75) Inventors: Monika Bauer, Koenigs-Wusterhausen (DE); Daniel Decker, Liederbach (DE); Guenther Motz, Bayreuth (DE)

(73) Assignees: Fraunhofer-Gesellschaft zur Foerderung der angewandten Forschung e.V., Munich (DE); Clariant Finance (BVI) Ltd., British Virgin Islands (GB)

( * ) Notice: Subject to any disclaimer, the term of this patent is extended or adjusted under 35 U.S.C. 154(b) by 451 days.

(21) Appl. No.: 13/514,795

(22) PCT Filed: Dec. 8, 2010

(86) PCT No.: PCT/EP2010/069196
§ 371 (c)(1),
(2), (4) Date: Jun. 8, 2012

(87) PCT Pub. No.: WO2011/070081
PCT Pub. Date: Jun. 16, 2011

(65) Prior Publication Data
US 2012/0248641 A1 Oct. 4, 2012

(30) Foreign Application Priority Data
Dec. 9, 2009 (DE) .......... 10 2009 059 777

(51) Int. Cl.
| | | |
|---|---|---|
| C04B 35/565 | (2006.01) | |
| D01F 6/38 | (2006.01) | |
| C08F 220/44 | (2006.01) | |
| C04B 35/628 | (2006.01) | |
| C04B 35/622 | (2006.01) | |
| C08F 283/00 | (2006.01) | |
| C08G 77/62 | (2006.01) | |

(52) U.S. Cl.
CPC .......... *C08F 220/44* (2013.01); *C04B 35/6281* (2013.01); *C04B 35/62295* (2013.01); *C08F 283/00* (2013.01); *C08G 77/62* (2013.01); *D01F 6/38* (2013.01); *C04B 2235/483* (2013.01); *C04B 2235/5264* (2013.01); *C04B 2235/6021* (2013.01)

(58) Field of Classification Search
None
See application file for complete search history.

(56) References Cited

U.S. PATENT DOCUMENTS

| | | | |
|---|---|---|---|
| 3,239,489 A | 3/1966 | Fink et al. | |
| 3,393,218 A * | 7/1968 | Van Wazer et al. | ........... 556/412 |
| 4,395,460 A | 7/1983 | Gaul | |
| 4,552,905 A | 11/1985 | Keil et al. | |
| 4,595,775 A | 6/1986 | Arkles | |
| 4,621,383 A | 11/1986 | Gendala | |
| 4,929,704 A | 5/1990 | Schwark | |
| 4,935,481 A | 6/1990 | Vaahs et al. | |
| 5,001,090 A | 3/1991 | Schwark | |
| 5,021,533 A | 6/1991 | Schwark | |
| 6,165,551 A | 12/2000 | Lukacs, III et al. | |
| 6,329,487 B1 | 12/2001 | Abel et al. | |
| 6,652,978 B2 | 11/2003 | Lukacs, III et al. | |

FOREIGN PATENT DOCUMENTS

| | | |
|---|---|---|
| EP | 0131179 | 6/1987 |
| WO | WO8705298 | 9/1987 |
| WO | WO2006071907 | 7/2006 |
| WO | WO2006071914 | 7/2006 |
| WO | WO 2007/145996 A2 | 12/2007 |
| WO | WO 2014/138807 * | 9/2014 |

OTHER PUBLICATIONS

Kokott et al., Modifizierung des ABSE-Polycarbosilazans mit Multi-Walled Carbon Nanotubes zur Herstellung spinnfahiger Massen, Mat.-wiss. u. Werkstofftech, 2007, vol. 38, No. 11, pp. 894-900.

* cited by examiner

Primary Examiner — Marc Zimmer
(74) Attorney, Agent, or Firm — Duane Morris LLP

(57) ABSTRACT

The present invention pertains to a copolymer obtained by reacting a mixture of acrylonitrile or of a mixture of acrylonitrile and an organic molecule that can be copolymerized with acrylonitrile, with which a monomeric, oligomeric and/or polymeric silazane can be obtained, said silazane containing at least one vinylic double bond. The copolymer can be brought into fiber form and/or made infusible. The production of ceramic fibers by pyrolysis is possible with fiber-like copolymers.

15 Claims, No Drawings

ACRYLONITRILE-SILAZANE COPOLYMERS, ESPECIALLY IN FIBER FORM, PROCESS FOR PREPARATION THEREOF AND USE THEREOF

The present invention pertains to copolymers of acrylonitrile and silazanes that display at least one organic polymerizable double bond, and in particular a vinyl group. The copolymers are interesting because of the silicon, nitrogen and carbon atom contents, e.g., as fire-protection materials or as initial materials for pyrolyzed systems of the composition SiCN (silicon carbonitrides), SiC (silicon carbides) or SiN (silicon nitrides). The materials may be present in any form, particularly in the form of fibers, both pyrolyzed and also not pyrolyzed.

The above-mentioned systems are suitable as materials for a broad spectrum of applications since they display high mechanical strengths at high temperatures as well as good oxidation resistance. The pyrolyzed products have the properties of ceramics and are used, e.g., in the form of fibers or ceramic matrices as reinforcing elements in structural parts exposed to or are intended to withstand high temperatures and/or corrosive media.

Addition polymers of polysilazanes with isocyanates or isothiocyanates are described in U.S. Pat. No. 4,929,704, U.S. Pat. No. 5,001,090 and U.S. Pat. No. 5,021,533. Mainly linear product mixtures are produced with iso(thio)cyanates, in which —N—C(A) groups (with A=O or S) are inserted in Si—N bonds. The reaction of a liquid polysilazane that has reacted with 2,6-toluene diisocyanate leads to a glass-like product with a clearly elevated carbon content. In these documents, the possibility of reacting polysilazanes with ketenes, thioketenes, carbodiimide or $CS_2$ is also mentioned. However, one cannot find specific examples of this or even of the properties of the product. The products have been proposed as the initial material for ceramic fibers containing silicon nitride.

SiC ceramic fibers are often synthesized by starting with silanes/polysilanes. This synthesis route, however, is not free from problems. Thus, for the—rarely used—dry spinning process, pyrolysis products from initial materials have been found, which are soluble, on the one hand, and on the other hand, melt under the influence of the thermal energy introduced at the time of pyrolysis. Materials that satisfy this criterion, however, are frequently only produced by complicated techniques or else have to be hardened before the actual pyrolysis. We refer here to the studies at TU Bergakademie Freiburg and the Institute for Silicate Research of the Fraunhofer Society in Würzburg.

A melt-spinning process is more commonly used. In such cases, however, the necessity of having to harden the polymer fibers by electron bombardment is especially of disadvantage, for which extremely high doses of about 20 MGy are required.

The object of the present invention is to find a material suitable for the field of flame and fire protection that can be fabricated into stable shaped bodies, e.g., self-supporting fibers. In preferred embodiments, in particular, a pyrolysis should be applied to materials in the form of stable fibers in order to obtain materials of the composition SiC, SiN or SiCN.

To accomplish this object, a copolymer was prepared that was made from (i) acrylonitrile or of a mixture [consisting of] acrylonitrile and an organic molecule that can be copolymerized with acrylonitrile and (ii) a silazane material containing a C=C double bond.

The term "silazane" refers in general to compounds that contain the group $R^1R^2R^3Si$—$N(R^4)SiR^5R^6R^7$. A very simple representative of this group is disilazane $H_3Si$—NH—$SiH_3$. Cyclic and linear silazanes contain or consist of —Si($R^1R^2$)—N($R^3$)— structural units. Starting with the basic structures, a large number of silazanes have been developed whose substituents on the silicon may be, e.g., besides hydrogen, alkyl, alkenyl or aryl and whose substituents on the nitrogen may be, besides hydrogen, alkyl or aryl. Oligomeric and polymeric structures exist, also with incorporation of additional groups such as urea groups, as well as different rings and multiple rings.

The inventors of the present application were able to discover, surprisingly, that silazanes displaying one or more C=C double bonds can be copolymerized with acrylonitrile in solvents suitable for this material in the presence of suitable addition polymerization catalysts to form polymers that remain soluble in the reaction solvents generally used (e.g., DMF or another solvent suitable for acrylonitrile). The copolymerizates are generally soluble in the same solvents as acrylonitrile and polyacrylonitrile. After the removal of the solvent, they are present in solid form at room temperature, but when the temperature is raised, they become highly viscous. The melt has viscoelastic properties and can accordingly be drawn into fibers. The latter can be further cross-linked after cooling and optionally stretching with electron bombardment and thereby made infusible or transformed into a duroplastic state. A pyrolysis of the fibers can be carried out after such secondary hardening of the fibers.

The copolymerization proceeds according to the formula:

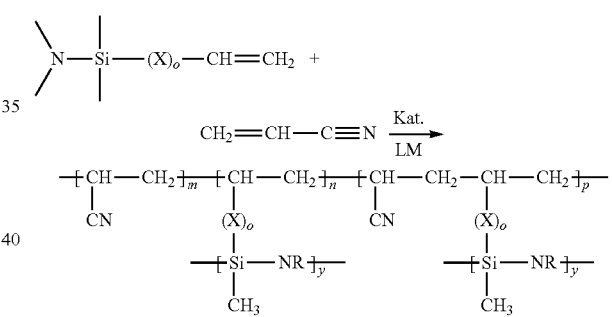

where X=alkylene
o=0 or 1,
m=0, 1, 2, 3 or an arbitrary higher number,
n=0, 1, 2, 3 or an arbitrary higher number,
p=0, 1, 2, 3 or an arbitrary higher number,
with the qualification that m and p cannot simultaneously be 0 and that n and p cannot simultaneously be 0,
y=number of Si—N units in the silazane used,
R=the substituent in the silazane used, generally corresponding to $R^2$ of the formulas (I) to (III) given below.

The formula above reflects the fact that, depending on the initial material used and the duration of the polymerization/its temperature/the type of catalyst selected, blocks of the same length or different lengths of oligopolymerizates of acrylonitrile and of the silazane used are contained in the formed polymer (p=0), alternating acrylonitrile and silazane molecules incorporated by polymerization alternate (m and n in each case=0) or else a mixed form is created from the two above-mentioned forms with the different constituents (m not equal to 0, n not equal to 0, p not equal to 0). Suitable reaction partners for the acrylonitrile are all monomeric, oligomeric or polymeric silazanes with one or more alkenyl groups bound to the silicon.

The term "oligomeric silazanes" should be understood to mean silazanes with 2 to 10 silicon atoms according to the present invention. Polymeric silazanes are accordingly those with at least 11 silicon atoms.

The silazanes or oligo/poly-silazanes that may be used have general formula (I)

$$R^1 \!\!-\!\!\left[\!\!\begin{array}{c}R^2\\|\\Si\\|\\R^3\end{array}\!\!-\!\!N\!\!\right]_m\!\!\left[\!\!\begin{array}{c}R^{2'}\\|\\Si\\|\\R^{3'}\end{array}\!\!-\!\!N\!\!\right]_n\!\!\left[\!\!\begin{array}{c}R^2\\|\\Si\\|\\R^3\end{array}\!\!-\!\!P\!\!-\!\!\begin{array}{c}R^{2'}\\|\\Si\\|\\R^{3'}\end{array}\!\!-\!\!N\!\!\right]_o\!\!R^5,$$

or general formula (II), $$R^1 \!\!-\!\!\left[\!\!\begin{array}{c}R^2\\|\\Si\\|\\R^3\end{array}\!\!-\!\!N\!\!\right]_m\!\!\left[\!\!\begin{array}{c}R^{2'}\\|\\Si\\|\\R^{3'}\end{array}\!\!-\!\!N\!\!\right]_n\!\!\left[\!\!\begin{array}{c}R^2\\|\\Si\\|\\R^3\end{array}\!\!-\!\!N\!\!-\!\!\begin{array}{c}\\C\\||\\O\end{array}\!\!-\!\!N\!\!\right]_p\!\!R^5$$

or general formula (III), $$R^1 \!\!-\!\!\left[\!\!\begin{array}{c}R^2\\|\\Si\\|\\R^3\end{array}\!\!-\!\!N\!\!\right]_m\!\!\left[\!\!\begin{array}{c}R^{2'}\\|\\Si\\|\\R^{3'}\end{array}\!\!-\!\!N\!\!\right]_n\!\!R^6$$

in which
$R^2$ is alkenyl,
$R^3$ means hydrogen or straight-chained, branched or cyclic, substituted or—preferably—unsubstituted alkyl, the same alkenyl as $R^2$ or a different alkenyl, aryl, arylalkyl, alkylaryl, alkenylaryl or arylalkenyl, where each of the substituents $R^2$ and $R^3$ in the case when m and/or o is/are greater than 1 in different units can have a different but preferably the same meaning, (a) $R^{2'}$ and $R^{3'}$ are the same or different and mean straight-chained, branched or cyclic, substituted or unsubstituted alkyl, alkenyl, aryl, arylalkyl, alkylaryl, alkenylaryl or arylalkenyl, where each of the substituents $R^{2'}$ and $R^{3'}$ in the case when m and/or o is/are greater than 1 in different units can have a different meaning but preferably the same meaning,
or
(b) $R^2$ and $R^{2'}$ have the meaning given above, and in the presence of at least one radical $R^3$ and at least one radical $R^{3'}$—all or in each case a part of the radicals $R^3$ and $R^{3'}$ together represent an unsubstituted or substituted, straight-chained or branched alkylene group with preferably 2 bridging carbon atoms, in which case optionally the remaining part of the radicals $R^3$ and $R^{3'}$ has the meaning given under (a),
and in which
$R^4$ and $R^{4'}$ denote alkyl with preferably 1 to 4 carbon atoms, phenyl or hydrogen, wherein several radicals $R^4$ and/or $R^{4'}$ in one molecule may be the same or different,
$R^1$ and $R^5$ are the same or different and can have the same meaning as $R^2$ and $R^3$, respectively, while $R^5$ may also denote $Si(R^1)(R^{2'})(R^{3'})$ or $R^1$ and $R^5$ together represent a single bond, $R^6$ denotes $Si(R^2)(R^{2'})$—X—$R^7$—$Si(R^2)_q(OR^{2'})_{3-q}$ where X represents either O or $NR^4$,
$R^7$ means a single bond or a substituted or—preferably—unsubstituted, straight-chained, branched or cyclic alkylene group and q may be 0, 1, 2 or 3,
P is an alkylene group with 1 to 12 carbon atoms, preferably ethylene,
m and p independently of each other denote 1, 2, 3, 4, 5, 6, 7, 8, 9, 10 or a whole number between 11 and 25,000, preferably between 11 and 200, and
m and p independently of each other denote 0, 1, 2, 3, 4, 5, 6, 7, 8, 9, 10 or a whole number between 11 and 25,000, preferably between 11 and 200,
wherein the units placed in square brackets can be distributed in a given molecule, preferably randomly or instead in blocks and may possibly be distributed alternatively uniformly in each individual molecule.

The term "units" in connection with the definition of silazanes with the formulas (I) to (III) pertains to the different parts of the molecule placed in square brackets and with a subscript stating the quantity of these units in the molecule (m, n . . . ).

In a first preferred embodiment, $R^2$ in formulas (I) to (III) is a vinyl group.

$R^3$ in this embodiment is more preferably alkyl, quite especially preferably methyl or ethyl.

If n in formulas 1 to 3 is at least 1, the substituents ($R^{2'}$ and $R^{3'}$) bound in each case to a silicon atom of the corresponding units are selected independently of the first preferred embodiment, preferably as follows: an alkyl radical in combination with a hydrogen atom, another alkyl radical, an alkenyl radical, preferably a vinyl radical or a phenyl radical.

In a third preferred embodiment independent of this, the alkyl or alkenyl radicals in formulas (I) through (III) display 1 to 6 carbon atoms. Methyl, ethyl and vinyl radicals are especially preferred. The aryl, arylalkyl, alkylaryl, alkenylaryl or arylalkenyl radicals preferably have 5 to 12 carbon atoms. Phenyl and styryl radicals are especially preferred. This embodiment is especially preferred in combination with the first embodiment.

In another preferred embodiment of formulas (I) through (III) independent of this, $R^4$ and/or $R^{4'}$ denote alkyl, especially methyl. The carbon fibers produced with such materials are said to have superior properties.

In a fifth embodiment independent of this, $R^2$, $R^3$, $R^{2'}$ and $R^{3'}$ are preferably selected from among the alkyls, especially those with 1 to 8 carbon atoms.

In a sixth embodiment independent of this one, the substituents $R^2$, $R^3$, $R^{2'}$ and $R^{3'}$ carry fluorine atoms. This embodiment is especially preferred in combination with the fourth embodiment.

In another independent preferred embodiment of formula (I), the subscript o is equal to 0.

In another independent preferred embodiment of formulas (I) or (II), the subscript m is always equal to 0.

In another independent preferred embodiment $R^1$ and $R^5$ together form a single bond. This embodiment is especially preferred for compounds with formula (I), in which the subscript o is zero and possibly the subscript m is also zero.

In another independent preferred embodiment, o is equal to 0 and m and n are greater than 1 and preferably lie between 2 and 25,000, especially between 2 and 200. In this case m and n may be the same or different. In addition or alternatively, the m and n units may be randomly or uniformly distributed. In this case, they may be arranged in blocks or not.

In another preferred embodiment independent of this one, n and o in formula (I) have the meaning of zero and $R^5$ has the meaning of $Si(R^1)(R^{2'})(R^{3'})$. An example of this embodiment (here with m=1) is:

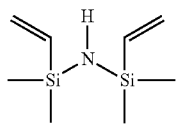

The single bond mark in these examples can stand especially for alkyl, quite especially preferably for methyl, but they may also stand for hydride or partially for alkyl and partially for hydride.

In another independent preferred embodiment, m in formula (I) has the meaning of 1, 2, 3, 4 5 or for a whole number between 6 and 50, while n and o are zero, or a mixture of different silazanes of this type may be involved. In this case the substituents $R^1$ and $R^5$ may be the same or different and have the same meaning as $R^3$, while $R^5$ may also mean $Si(R^1)(R^{2'})(R^{3'})$. This or these silazanes may, if necessary, also be present in a mixture with silazanes in which $R^1$ and $R^5$ together represent a single bond.

In another independent preferred embodiment, o in formula (I) is zero and m and n are the same or different and signify between 2 and 200 and 25,000. In this case the substituents $R^1$ and $R^5$ may be the same or different and have the same meaning as $R^3$, while $R^5$ may also mean $Si(R^1)(R^{2'})(R^{3'})$. This or these silazanes may, if necessary, also be present in a mixture with silazanes in which $R^1$ and $R^5$ together represent a single bond.

Examples are the following oligomers/polymers:

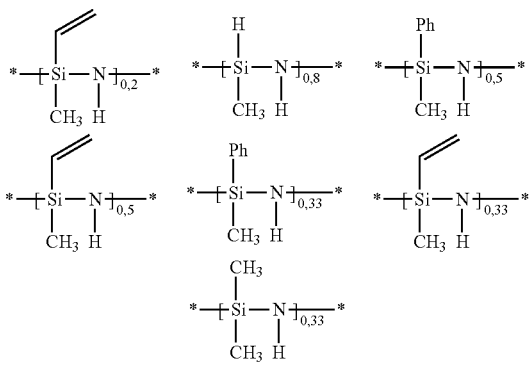

where the units in square brackets are arranged randomly in the molecules, or possibly instead of this are arranged in blocks and in other cases uniformly in the stated ratio to each other, and the molecules may contain terminal hydrogen atoms or alkyl or aryl groups.

In another independent preferred embodiment, the subscripts n and o are equal to zero, the subscript m has the meaning 3, and $R^1$ and $R^5$ together represent a single bond. This embodiment can generally be represented by formula (Ia):

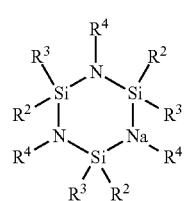

where $R^2$, $R^3$ and $R^4$ have the meanings given for formula (I).

In another independent preferred embodiment of formula (I) n and o have the meaning of 0, m has the meaning of 2, 3, 4, 5, 6, 7, 8, 9, 10 or a higher number and $R^1$ and $R^5$ together represent a single bond.

In another independent preferred embodiment of formulas (I) and (II) m and n each mean 2, 3, 4, 5, 6, 7, 8, 9, 10 or a higher number, and $R^1$ and $R^5$ together represent a single bond. These compounds can be represented (here for o and p equal to 0) in turn, for example, by formulas such as

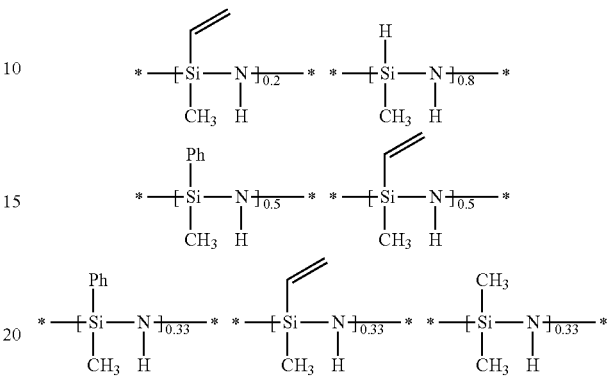

where, in turn, the units in square brackets are distributed in the molecules either randomly or in blocks, but also in many cases uniformly, m times or n times or in the case of the last shown formula together (m+n)-times in the stated ratio to each other, but the molecules are present in a closed chain format. These embodiments can be present especially in the mixture with corresponding open-chained silazanes and be used for the present invention.

To the extent that the embodiments mentioned above as preferred are not mutually exclusive, two or more of them may be combined.

Silazanes of formula (I) with o equal to 0 are available on the market and can be synthesized by standard procedures, especially ammonolysis of monohalosilanes, e.g., as described in U.S. Pat. No. 4,395,460 and in the literature cited there. In this case, for example, through the reaction of a monohalosilane with three organic radicals, silazanes of formula (I) are formed, in which the subscripts n and o are zero, the subscript m means 1, and $R^5$ has the meaning $Si(R^{1'})(R^{2'})(R^{3'})$. The organic radicals are not split off during the reaction.

It is also possible, by analogy with U.S. Pat. No. 6,329,487 B1 of the Kion Corporation to ammonolyze mono-, di- or trihalosilanes in the pressure apparatus in liquid ammonia and thereby to obtain silazanes of general formula (I).

If halosilanes are reacted at this time with at least one Si—H bond alone and/or in combination with di- or trihalosilanes in an excess of liquid anhydrous ammonia and left in this medium for a long time, polymerization products are formed in the acidic environment formed by the forming ammonium halide salt or corresponding acid in the course of time by the splitting-off reaction of Si—H bonds, in which the subscripts m, n and o have a higher value and/or a different ratio than previously, possibly catalyzed by the presence of dissolved and ionized ammonium halide.

In U.S. Pat. No. 6,329,487 B1 it is likewise described that corresponding polymerization products can be obtained by the action of sodium dissolved in ammonia.

U.S. Pat. No. 4,621,383 and WO 87/05298 also describe the possibility of synthesis of polysilazanes by transition-metal-catalyzed reactions.

By the suitable choice of the organic substituents on the silicon atom of the silane and by a mixture of corresponding initial silanes, by using this procedure a large number of silanes of formula (I) can be generated, in which the subscript o is zero, in which case frequently a mixture of linear and chain-like polymers is formed.

Regarding the reaction mechanism, also see the dissertation by Michael Schulz at the Karlsruhe Research Center, Institute for Material Research "Microstructuring of pre-ceramic polymers by using UV and X-ray deep lithography", November 2003, FZKA 6901. There the production of silazanes of formula (I) is also described, in which the subscript o is zero and the silicon atoms in the blocks with the subscripts m and n carry different substituents.

It also contains a reference to the production of urea silazanes. If monofunctional isocyanates are added to silazanes, an insertion reaction of the NCO group into N—H bonds takes place with formation of a urea group [see the above-described silazanes of formula (II)]. Otherwise, with regard to the production of urea silazanes and poly(urea silazanes) refer to U.S. Pat. No. 6,165,551, U.S. Pat. No. 4,929,704 and U.S. Pat. No. 3,239,489.

The formation of compounds of formula (III) (alkoxy-substituted silazanes) is known from U.S. Pat. No. 6,652,978 B2. For the production of these compounds, monomeric or oligomeric/polymeric silazanes of formula (I), where o is zero, can be reacted with amino or hydroxy-group-containing alkoxysilanes, e.g., 3-aminopropyl triethoxysilane.

A process for production of compounds of formula (I) with o not equal to zero is proposed in the dissertation by G. Motz (G. Motz, Dissertation, Stuttgart University, 1995) specifically using the example of ammonolysis of 1,2-bis(dichloromethylsilyl)ethane. The production of a special representative of these compounds, ABSE, is achieved according to S. Kokott and G. Motz, "Modification of ABSE Polycarbosilazane with Multi-Walled Carbon Nanotubes for the Production of Spinnable Compounds," *Mat.-wiss. u. Werkstofftech.* 2007, 38(11), 894-900, by hydrosilylation and ammonolysis of a mixture of $MeHSiCl_2$ and $MeViSiCl_2$.

N-Alkyl-substituted silazanes can, in turn, be synthesized in the same manner for the person skilled in the art directly by bringing the corresponding halosilanes into reaction with alkylamines, as described in U.S. Pat. No. 4,935,481 and U.S. Pat. No. 4,595,775.

The quantity ratio of silazane used to the acrylonitrile used is basically not critical. Thus, for example, the molar contents of silazane to acrylonitrile may lie in the range from 100:1 to 1:100. Proportions from 4:1 to 1:20 have been found to be favorable. The molar content of silazane is preferably not above that of acrylonitrile.

The reaction takes place in a solvent suitable for the components. In particular, the solvents commonly used for polymerization of acrylonitrile such as DMF, 1,3-dioxolan-2-one, dimethyl acetamide or DMSO may be used. A conventional catalyst for radical polymerizations, especially polyadditions, may be added. For example, one may resort here to the catalysts known for the production of polyacrylonitrile, e.g., azoisobutyronitrile.

The reaction is usually conducted at elevated temperature, e.g., at 40° C. to 100° C. (i.e., at the reflux temperature of the solvent); it is usually completed after a few hours. Products with linear —C—C— bonds are obtained. If the silazane or silazanes used contain at least two alkenyl groups, several such bonds may emerge from one silazane molecule or this molecule, respectively. Depending on the steric conditions, these silazanes can therefore be a starting point for three-dimensional bonds. If oligomeric or even polymeric silazanes are used, the product formed will also contain chains or rings from Si—N groups, which further increases the density of the structure.

It is preferred to create the materials according to the present invention exclusively from acrylonitrile and silazane. However, it is also possible for them to contain other additives.

As additives, for example, organic materials (monomers or other organic molecules) come into consideration, which can be copolymerized with acrylonitrile. For this purpose, for example, styrene and/or butadiene and/or vinyl carbazole come into question. In order not to impair the desired properties, especially the flame and fire protection too severely, these additives should generally not amount to more than 20 wt. % relative to the content of the sum of acrylonitrile and organic molecules. The organic substance(s) is/are preferably mixed with the same solution or charged in it, in which the other components are introduced in order to cause polymerization.

In addition, or instead of this, the material may also contain one or more fillers, preferably of inorganic nature, but possibly also organically modified, e.g. to facilitate their being incorporated by polymerization. The filler, depending on requirements, may be added in a quantity up to about 60 wt. % relative to the weight of the material. Quantities of up to 20 wt. % are preferred. The filler is preferably added before the solvent is removed.

The material of the present invention can basically be brought into any desired form. However, it is preferably used for the production of fibers or is present in fiber form.

For production of fibers, the solvent is removed from the polymer solution obtained (e.g., polymer suspension if a filler is added). The product is usually solid at room temperature. If the temperature is raised, a viscoelastic melt is formed from polymer molecules hooked together. In many cases, the softening point is above 100° C.

From the melt, preferably a melt free of filler, fibers are drawn, preferably by extrusion through a nozzle head containing a large number of nozzles. The nozzle cross section is preferably about 150-400 µm. The fibers are then cooled and at the same time preferably stretched, thus making the diameter clearly smaller; in the case of continuous fiber production, they are then preferably wound [on spools].

The fibers thus obtained are suitable for processing into textile materials, e.g., weaving, knitting, laying or for incorporation into polymer materials as a reinforcing agent. They are especially interesting for use in fire protection since they have fire-inhibiting properties due to the high content of silicon and nitrogen.

In addition, the fibers can be transformed into ceramic fibers by pyrolysis. For this purpose, the polymer fibers obtained from the melt are first made infusible by conventional methods, e.g., by bombardment with electron beams. Usually doses in the range of approx. 200 KGy are sufficient for this.

The pyrolysis is usually conducted in a protective gas free of oxygen, e.g., argon. The reaction conditions (gas atmosphere, temperature) can be selected such that the ratio of silicon to nitrogen to carbon in the product is held approximately the same (usually, however, the carbon content diminishes slightly because some methane can form). In this way, one can arrive at SiCN ceramic fibers. The latter can, if necessary, be transformed by conventional measures into SiC or SiN fibers, e.g., by heating the fibers to at least 1,450° C., in which case SiC is formed, or by pyrolysis in an ammonia atmosphere, leading to the formation of methane from the carbon.

The following examples are intended to explain the invention in more detail. The equivalent ratios given refer to the double bonds (vinyl or acrylic).

EXAMPLE 1

Reaction of divinyl tetramethyl disilazane (DVTMDS) with acrylonitrile (ACN) in a ratio of 1:1

Under a nitrogen atmosphere, 1.59 g (8.6 mol) of DVTMDS, 0.91 g (17.2 mmol) ACN and 2.5 g of dimethyl formamide (DMF) are brought together in a three-necked flask equipped with a reflux condenser with bubble counter, gas feed line and magnetic agitator. To this mixture, 37.5 mg of azoisobutyronitrile (AIBN) are added, followed by stirring for five hours at 75° C. Depending on the batch, one will obtain a dark yellow to amber colored liquid. The vinylic double bond of the silazane has almost totally vanished according to the Raman spectrum.

EXAMPLE 2

Reaction of divinyl tetramethyl disilazane with acrylonitrile in a ratio of 1:4

Under a nitrogen atmosphere, 0.76 g (4.1 mol) of DVTMDS, 1.74 g (32.8 mmol) ACN and 2.5 g of dimethyl formamide (DMF) are brought together in a three-necked flask equipped with a reflux condenser with bubble counter, gas feed line and magnetic agitator. To this mixture, 37.5 mg of azoisobutyronitrile (AIBN) are added, followed by stirring for five hours at 75° C. Depending on the batch, one will obtain a dark yellow to amber-colored liquid. The vinylic double bond of the silazane has almost totally vanished according to the Raman spectrum.

EXAMPLE 3

Reaction of a cyclic silazane obtained by ammonolysis of a mixture of 50 mol. % dichlorovinylmethyl silane and 50 mol. % of dichlorodimethylsilane (VML50) with acrylonitrile in a molar ratio of 1:1

Under a nitrogen atmosphere, 1.82 g of VML50, 0.61 g ACN and 2.5 g of dimethyl formamide (DMF) are brought together in a three-necked flask equipped with a reflux condenser with bubble counter, gas feed line and magnetic agitator. To this mixture, 75 mg of (0.46 mmol) of azoisobutyronitrile (AIBN) are added, followed by stirring for five hours at 75° C. One obtains a yellow, highly viscous solution.

EXAMPLE 4

Reaction of a cyclic silazane obtained by ammonolysis of a mixture of 50 mol. % dichlorovinylmethyl silane and 50 mol. % of dichlorodimethylsilane (VML50) with acrylonitrile in a molar ratio of 1:4

Under a nitrogen atmosphere, 1.04 g (0.66 mmol-equ) of VML50, 1.39 g (26.1 mmol) of ACN and 2.5 g dimethyl formamide (DMF) are brought together in a three-necked flask equipped with a reflux condenser with bubble counter, gas feed line and magnetic agitator. To this mixture, 75 mg of (0.46 mmol) of azoisobutyronitrile (AIBN) are added, followed by stirring for five hours at 75° C. After less than two hours, the stirring is halted by gel formation. A yellow gel is obtained.

EXAMPLE 5

Production of Fibers

The polymer obtained by polymerization of a vinyl silazane with acrylonitrile is freed of solvent and heated until a viscous melt is formed. The latter is pressed through a nozzle plate with several hundred nozzles with diameters of 200 or 300 μm. The threads thus formed sink down due to gravity in a space with normal room temperature. The fiber ends are caught and the fiber bundle is wound under tension on a rotating roller, at which time the fibers are stretched to a thickness of about 10-30 μm.

EXAMPLE 6

Secondary Stretching of the Fibers

The fibers of Example 5 are exposed to electron bombardment of 200 KGy. Following this, they are duroplastic and are then infusible.

The invention claimed is:

1. Copolymer obtained by reaction which comprises reacting:
   (i) acrylonitrile with
   (ii) at least one monomeric, oligomeric and/or polymeric silazane, where said silazane contains at least one vinylic double bond,
   the silazane being selected from those of general formula (I):

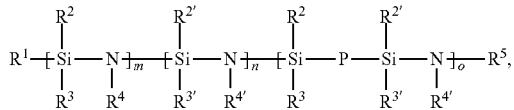

of general formula (II),

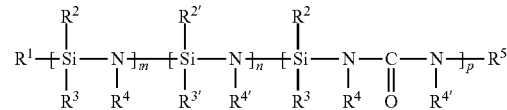

and of general formula (III),

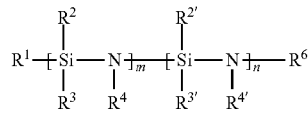

in which
(a) $R^2$ is alkenyl,
   $R^3$ means hydrogen or straight-chained, branched or cyclic, substituted or unsubstituted alkyl, the same alkenyl as $R^2$ or a different alkenyl, aryl, arylalkyl, alkylaryl, alkenylaryl or arylalkenyl, where each of the substituents $R^2$ and $R^3$ in the case when m and/or o is/are greater than 1 in different units has a different or the same meaning,
   $R^{2'}$ and $R^{3'}$ are the same or different and mean straight-chained, branched or cyclic, substituted or unsubstituted alkyl, alkenyl, aryl, arylalkyl, alkylaryl, alkenylaryl or arylalkenyl, where each of the substituents $R^{2'}$ and $R^{3'}$ in the case when m and/or o is/are greater than 1 in different units has a different meaning or the same meaning,
or
(b) if at least one radical $R^3$ and one radical $R^{3'}$ are present, $R^2$ and $R^{2'}$ have the meaning given above, and (i) all or (ii) in each case a part of the radicals $R^3$ and $R^{3'}$ together represent an unsubstituted or substituted, straight-chained or branched alkylene group, wherein in variant (ii) the remaining part of the radicals $R^3$ and $R^{3'}$ has the meaning given under (a), and in which $R^4$ and $R^{4'}$ denote alkyl, phenyl or hydrogen, wherein several radicals $R^4$ and/or $R^{4'}$ present in one molecule of compounds (I) to (III) may be the same or different, $R^1$ and $R^5$ are the same or different and can have the same meaning as $R^2$ and $R^3$, respectively, while $R^5$ may also denote $Si(R^1)(R^{2'})(R^{3'})$ or $R^1$ and $R^5$ together represent a single bond, $R^6$ denotes $Si(R^2)(R^{2'})$—X—$R^7$—$Si(R^2)_q(OR^{2'})_{3-q}$ where X means either O or $NR^4$, $R^7$ means a single bond or represents a substituted or unsubstituted, straight-chained, branched or cyclic alkylene group, and q may be 0, 1, 2 or 3, P is an alkylene group with 1 to 12 carbon atoms, m and p independently of each other denote 1, 2, 3, 4, 5, 6, 7, 8, 9, 10 or a whole number between 11 and 25,000, and n and o independently of each other denote 0, 1, 2, 3, 4, 5, 6, 7, 8, 9, 10 or a whole number between 11 and 25,000, wherein the units placed in square brackets can be distributed in a given molecule uniformly, randomly or in blocks.

2. Copolymer in accordance with claim 1, obtained exclusively from acrylonitrile and silazane.

3. Copolymer in accordance with claim 1 obtained by including in the reaction a co-monomer in a proportion of no more than 20 wt. % of the mixture.

4. Copolymer in accordance with claim 3, wherein the co-monomer is selected from the group consisting of styrene, butadiene, vinyl carbazole, or a mixture thereof.

5. Copolymer in accordance with claim 1, characterized in that the copolymer is filled with a filler.

6. Copolymer in accordance with claim 1, in fiber form.

7. Copolymer in accordance with claim 6, characterized in that the copolymer is infusible.

8. Process for the production of a copolymer as defined in claim 1, characterized in that (i) acrylonitrile and (ii) at least one monomeric, oligomeric and/or polymeric silazane that contains at least one vinylic double bond, the silazane being selected from those of general formula (I):

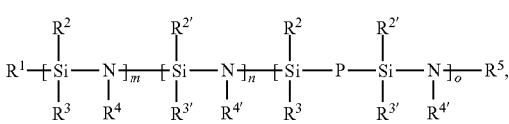

of general formula (II),

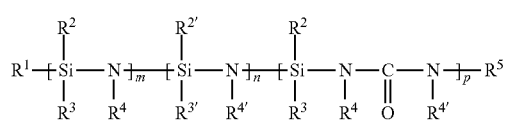

and of general formula (III),

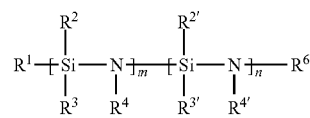

in which (a) $R^2$ is alkenyl, $R^3$ means hydrogen or straight-chained, branched or cyclic, substituted or unsubstituted alkyl, the same alkenyl as $R^2$ or a different alkenyl, aryl, arylalkyl, alkylaryl, alkenylaryl or arylalkenyl, where each of the substituents $R^2$ and $R^3$ in the case when m and/or o is/are greater than 1 in different units has a different or the same meaning, $R^{2'}$ and $R^{3'}$ are the same or different and mean straight-chained, branched or cyclic, substituted or unsubstituted alkyl, alkenyl, aryl, arylalkyl, alkylaryl, alkenylaryl or arylalkenyl, where each of the substituents $R^{2'}$ and $R^{3'}$ in the case when m and/or o is/are greater than 1 in different units has a different meaning or the same meaning, or (b) if at least one radical $R^3$ and one radical $R^{3'}$ are present, $R^2$ and $R^{2'}$ have the meaning given above, and (i) all or (ii) in each case a part of the radicals $R^3$ and $R^{3'}$ together represent an unsubstituted or substituted, straight-chained or branched alkylene group, wherein in variant (ii) the remaining part of the radicals $R^3$ and $R^{3'}$ has the meaning given under (a), and in which $R^4$ and $R^{4'}$ denote alkyl, phenyl or hydrogen, wherein several radicals $R^4$ and/or $R^{4'}$ present in one molecule of compounds (I) to (III) may be the same or different, $R^1$ and $R^5$ are the same or different and can have the same meaning as $R^2$ and $R^3$, respectively, while $R^5$ may also denote $Si(R^1)(R^{2'})(R^{3'})$ or $R^1$ and $R^5$ together represent a single bond, $R^6$ denotes $Si(R^2)(R^{2'})$—X—$R^7$—$Si(R^2)_q(OR^{2'})_{3-q}$ where X means either O or $NR^4$, $R^7$ means a single bond or represents a substituted or unsubstituted, straight-chained, branched or cyclic alkylene group, and q may be 0, 1, 2 or 3, P is an alkylene group with 1 to 12 carbon atoms, m and p independently of each other denote 1, 2, 3, 4, 5, 6, 7, 8, 9, 10 or a whole number between 11 and 25,000, and n and o independently of each other denote 0, 1, 2, 3, 4, 5, 6, 7, 8, 9, 10 or a whole number between 11 and 25,000, wherein the units placed in square brackets can be distributed in a given molecule uniformly, randomly or in blocks, are dissolved in a solvent and copolymerized by means of a catalyst for radical polymerization.

9. Process in accordance with claim 8, characterized in that a filler is added to the solvent.

10. Process for the production of fibers from a copolymer as defined in claim 1, characterized in that (A) (i) acrylonitrile and (ii) at least one monomeric, oligomeric and/or polymeric silazane that contains at least one vinylic double bond, the silazane being selected from those of general formula (I):

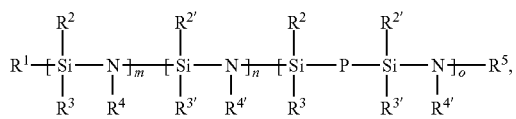

of general formula (II),

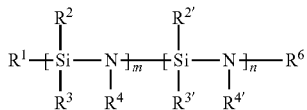

and of general formula (III),

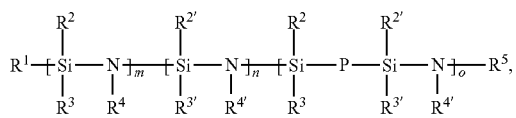

in which
(a) $R^2$ is alkenyl,
$R^3$ means hydrogen or straight-chained, branched or cyclic, substituted or unsubstituted alkyl, the same alkenyl as $R^2$ or a different alkenyl, aryl, arylalkyl, alkylaryl, alkenylaryl or arylalkenyl, where each of the substituents $R^2$ and $R^3$ in the case when m and/or o is/are greater than 1 in different units has a different or the same meaning,
$R^{2'}$ and $R^{3'}$ are the same or different and mean straight-chained, branched or cyclic, substituted or unsubstituted alkyl, alkenyl, aryl, arylalkyl, alkylaryl, alkenylaryl or arylalkenyl, where each of the substituents $R^{2'}$ and $R^{3'}$ in the case when m and/or o is/are greater than 1 in different units has a different meaning or the same meaning,
or
(b) if at least one radical $R^3$ and one radical $R^{3'}$ are present, $R^2$ and $R^{2'}$ have the meaning given above, and (i) all or (ii) in each case a part of the radicals $R^3$ and $R^{3'}$ together represent an unsubstituted or substituted, straight-chained or branched alkylene group, wherein in variant (ii) the remaining part of the radicals $R^3$ and $R^{3'}$ has the meaning given under (a), and in which
$R^4$ and $R^{4'}$ denote alkyl, phenyl or hydrogen, wherein several radicals $R^4$ and/or $R^{4'}$ present in one molecule of compounds (I) to (III) may be the same or different, $R^1$ and $R^5$ are the same or different and can have the same meaning as $R^2$ and $R^3$, respectively, while $R^5$ may also denote $Si(R^1)(R^{2'})(R^{3'})$ or $R^1$ and $R^5$ together represent a single bond,
$R^6$ denotes $Si(R^2)(R^{2'})$—X—$R^7$—$Si(R^2)_q(OR^{2'})_{3-q}$ where X means either O or $NR^4$, $R^7$ means a single bond or represents a substituted or unsubstituted, straight-chained, branched or cyclic alkylene group, and q may be 0, 1, 2 or 3,
P is an alkylene group with 1 to 12 carbon atoms,
m and p independently of each other denote 1, 2, 3, 4, 5, 6, 7, 8, 9, 10 or a whole number between 11 and 25,000, and
n and o independently of each other denote 0, 1, 2, 3, 4, 5, 6, 7, 8, 9, 10 or a whole number between 11 and 25,000,
wherein the units placed in square brackets can be distributed in a given molecule uniformly, randomly or in blocks,
are dissolved in a solvent and copolymerized by means of a catalyst for radical polymerization,
(B) the solvent is separated from the copolymer solution obtained,
(C) the product obtained according to (B), if it is not liquid or viscous at room temperature, is transformed into a melt, and
(D) the product or melt created from it is extruded through one or more nozzles, resulting in the formation of fibers.

11. Process in accordance with claim 10, wherein the extruded fibers subsequently are made infusible.

12. Process in accordance with claim 11, wherein the extruded fibers are made infusible by irradiation with electron beams.

13. Process for the production of SiCN ceramic fibers, characterized in that infusible fibers produced according to the process of claim 11 are pyrolyzed under oxygen-free protective gas.

14. Process for the production of SiC ceramic fibers, characterized in that SiCN ceramic fibers produced as claimed in claim 13 are heated to at least 1,450° C.

15. Process for the production of SiN ceramic fibers, characterized in that SiCN ceramic fibers produced as claimed in claim 13 are pyrolyzed in an ammonia atmosphere.

* * * * *